Nov. 16, 1948.  E. L. SCHULMAN  2,454,218
COMPOSITE ASBESTOS MEMBER
Filed Nov. 10, 1943
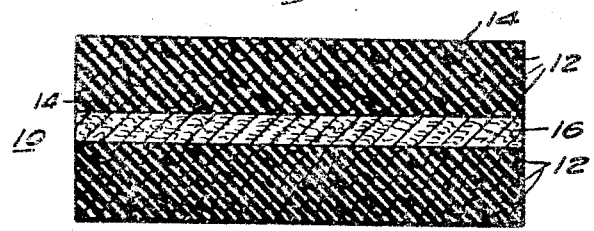
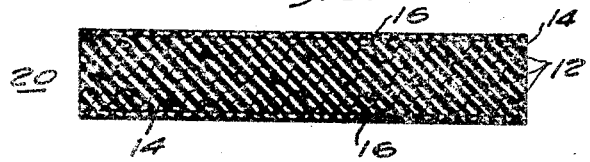
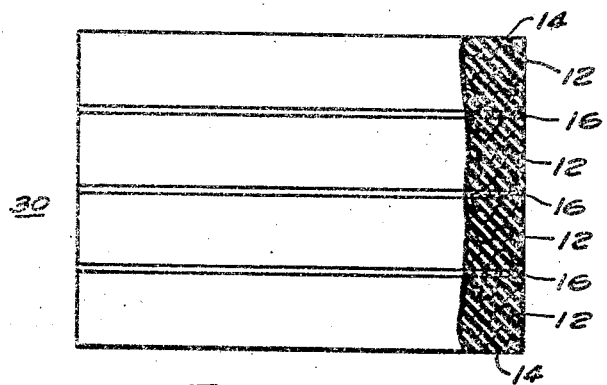
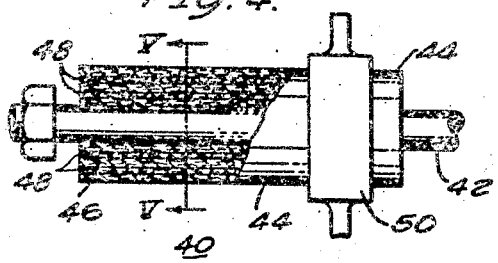 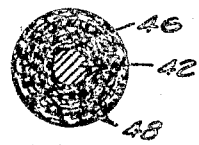
WITNESSES:
INVENTOR
Earl L. Schulman.

Patented Nov. 16, 1948

2,454,218

UNITED STATES PATENT OFFICE 2,454,218

COMPOSITE ASBESTOS MEMBER

Earl L. Schulman, Wilkinsburg, Pa., assignor to Westinghouse Electric Corporation, East Pittsburgh, Pa., a corporation of Pennsylvania Application November 10, 1943, Serial No. 509,737

3 Claims. (Cl. 154—2.6)

This invention relates to composite members prepared from asbestos impregnated with a resin, and more particularly to composite asbestos members suitable for use as electrical insulation.

Asbestos cloth composed of relatively long fibers has been employed heretofore in combination with resins in producing laminated members having certain characteristics of strength and temperature resistance. It has been discovered, however, that the breakdown voltage of this material in many cases is even less than that of the corresponding air gap, for example, a 60-mil thick sheet produced from asbestos cloth impregnated with a phenolic resin had a dielectric breakdown strength of approximately 3600 volts. In some instances sheets of this material of the same thickness exhibited breakdown strength of less than 2000 volts. This is less than the breakdown voltage of a corresponding air gap.

It is believed that the extremely low dielectric breakdown strength of woven asbestos fabric and resin members may be attributed to the fact that the relatively long and thick fibers of asbestos are not completely impregnated with resin and are more conducting than the atmosphere. Even with careful application of impregnating resins and the use of high pressures to secure a thorough impregnation of the individual fibers, this defect persists.

The object of this invention is to provide a laminated asbestos member having high dielectric breakdown strength.

A further object of this invention is to provide for so combining asbestos paper and asbestos cloth, the whole impregnated with a resin, as to produce composite insulation having satisfactory electrical and physical properties.

Other objects of the invention will, in part, be obvious, and will, in part, appear hereinafter.

For a fuller understanding of the nature and objects of the invention, reference should be had to the following figures of the drawing, in which:

Figure 1 is a view in cross section of a composite member prepared according to this invention;

Fig. 2 is a view in cross section through a composite member showing a modification of the invention;

Fig. 3 is a view in elevation, partly in section, showing another form of the invention;

Fig. 4 is a fragmentary view, partly in section, of a still further form of the invention; and Fig. 5 is a view along section V—V of Fig. 4.

According to the invention, it has been discovered that consistently high dielectric breakdown strengths of from 150 to over 200 volts per mil may be obtained by embodying sheets of asbestos paper in members prepared from asbestos cloth and resin.

The asbestos fabric is customarily produced from long-fibered asbestos which may be spun and woven, braided or knitted into a cloth or fabric sheet. In some cases, long-fibered asbestos may be associated as a felted body. The characteristics of the relatively long-fibered asbestos which has been found to be a shortcoming is its relatively low dielectric breakdown strength which in many cases averages from 30 volts to 70 volts per mil for a 100-mil thick sample.

Asbestos paper is ordinarily produced by suspending finely divided relatively short fibered asbestos with wood pulp or other organic matter in water. In some cases cotton fibers are introduced into the suspension in order to impart strength to the paper to be laid down. Starch, or other filler such as clay and the like, is often introduced into the water in which the asbestos fibers are suspended. The suspension of asbestos fibers, with or without such additional fillers and wood pulp is poured over a screen in order to lay a paper therefrom. Upon pressing and drying, asbestos paper is produced. In some instances the paper may be prepared by finely ball-milling or otherwise subdividing asbestos fibers into a fine fibrous form known as "microfine" asbestos. Extremely thin paper may be produced from finely divided asbestos; such paper in many cases averaging from 1 to 5 mils in thickness as compared to 5 to 15 mils thickness for paper produced from ordinary short-fibered asbestos which has not been so finely divided. Either product, or its equivalent, may be employed in this invention with satisfactory results.

Where asbestos paper contains organic matter, such as wood pulp, cotton fibers, starch or the like, it may be advantageous to heat-treat the asbestos paper in a furnace exposed to the atmosphere for a period of time of from several hours to several days at temperatures of the order of 200 to 250° C. The heat treatment will burn out the major proportion of the organic material and leave substantially all asbestos fiber present in the paper. This treatment will produce an asbestos paper having somewhat better high temperature characteristics than asbestos paper containing a substantial proportion of organic material such as starch which may absorb moisture and result in undesirable electrical characteristics.

It has been found that the application of asbestos paper in between layers of asbestos cloth, all impregnated with a resin, will increase the dielectric breakdown strength of a member produced therefrom as compared to a similar member produced entirely from asbestos cloth and resin. The asbestos paper is preferably introduced in such a manner that the resulting member will have the paper disposed in a plane perpendicular to the voltage gradient of the electrical conductor to which it may be applied.

Referring to Fig. 1 of the drawing, there is illustrated the member 10 illustrating the simplest form of the invention. A plurality of layers of asbestos cloth 12 impregnated with resin 14 and a layer of asbestos paper 16 likewise impregnated with resin disposed in the middle of the fabric laminations are molded under heat and pressure into a unitary member. The improved dielectric strength by reason of the introduction of the single sheet of asbestos paper 16 is normally at least double that of the same thickness of the member produced without the asbestos paper.

Illustrative of the improvement in properties secured by the practice of the invention are the following examples: Asbestos cloth of a nominal thickness of 100 mils was impregnated with a maleic acid anhydride-propylene glycol-monostyrene resin solution. A plurality of laminations of the asbestos cloth were molded under pressure and heat into a thermoset body of 100 mils thickness. The short-time dielectric strength of this body perpendicular to the laminations was 3500 volts. A similar member was prepared with one sheet of 25-mil asbestos paper, initially heat-treated as disclosed herein and then impregnated with the same maleic anhydride-propylene glycol-monostyrene resin, inserted between a number of sheets of asbestos cloth also impregnated with the same resin and the assembly molded into a thermoset body of 100 mils thickness. When tested for dielectric breakdown strength perpendicular to plane of the molded sheets, the latter molded member exhibited a short-time breakdown strength of 27,000 volts.

In another case, when asbestos cloth having the nominal thickness of 35 mils was treated with a cresylic acid-formaldehyde condensate and a plurality of laminations were molded into a thermoset body having a thickness of 100 mils, the resulting body exhibited a variable breakdown voltage of from 30 to 70 volts per mil. The introduction of a single sheet of 25-mil asbestos paper in the center of a plurality of laminations of asbestos cloth, all treated with the same cresylic acid-formaldehyde resin, improved the breakdown strength to a value of 150 volts per mil for a 100 mil member. This last breakdown strength is approximately double that of the breakdown strength that has been feasible with all asbestos cloth phenol aldehyde resin laminate.

Another form of the invention may be seen by referring to Fig. 2 of the drawing, wherein the member 20 comprises a plurality of laminations of asbestos cloth 12 impregnated with, for instance, a thermosetting resin such as a phenol aldehyde condensate, and covered at either face by sheets of asbestos paper 16 impregnated with the same resin. The sheets of asbestos paper impregnated with resin are applied first and last in the mold in which the member is to be formed, with the desired number of asbestos cloth laminations disposed therebetween. Upon molding under heat and pressure a solid unitary member 20 is produced. The dielectric breakdown strength of the member 20 is approximately double that of a member of similar thickness produced by the use of asbestos cloth and resin alone. The member 20 (Fig. 2) has a finer surface than produced by the form of the invention of Fig. 1 inasmuch as asbestos paper has a smoother distribution of asbestos fibers. However, where the surface may be exposed to severe mechanical abuse such that it may be abraded or worn through, it may be more desirable to employ the form of the invention shown in Fig. 1, where the internal disposition of the asbestos paper layer renders it less subject to surface wear and tear.

While one layer of asbestos paper is usually sufficient for the practice of the invention, a plurality of layers of asbestos paper may be employed in combination with a body of asbestos cloth and resin. As shown in Fig. 3, the member 30 comprises four distinct strata of asbestos cloth 12 impregnated with resin and three intervening layers of asbestos paper 16. This form of the invention is particularly advantageous in producing relatively thick molded members.

The forms of the invention shown in Figs. 1, 2 and 3 are particularly adapted for separating members wherein the voltage gradient is disposed perpendicular to the plane of the lamination. In many cases the conductor to be insulated may be of such form or disposition that it is desirable to mold the members to a nonplanar form. For example, as illustrated in Fig. 4 of the drawing, a bushing 40 consisting of a central conductor 42 is insulated by a cylindrical molded member 44 consisting of a plurality of spirally or cylindrically wound laminations of asbestos cloth 46 impregnated with a resin, and a number of interleaved spirally or cylindrically wound laminations of asbestos paper 48 impregnated with resin. A support 50 is disposed about the insulation 44. The potential gradient extends radially from the conductor 42 to the support 50 and by disposing the layers of asbestos paper 48 perpendicular to the potential gradient lines, that is, along a generally cylindrical surface, the maximum dielectric breakdown strength is obtained.

In preparing insulation from asbestos cloth and resin to conform to other shaped members, the asbestos paper and cloth may be cut or shaped by preforming to any predetermined pattern. In many cases the entire exterior surfaces of the molded members can be covered with asbestos paper impregnated with resin. Thereby, regardless of how the member is employed, the dielectric strength will be satisfactory.

The advantages of asbestos cloth which require its use are its high mechanical strength as compared to that of asbestos paper. Furthermore, in the case of molding members having deep cavities, the asbestos cloth may be easily drawn to predetermined shape, whereas asbestos paper will not give any appreciable amount but will tear readily when stressed. By combining asbestos cloth laminations with a small number of interdisposed asbestos paper layers, a composite product having both excellent mechanical and electrical characteristics will be attained.

An exceptionally desirable combination is obtained by applying the maleic acid anhydride-propylene glycol-monostyrene resin herein referred to to asbestos cloth and asbestos paper combined in the manner set forth. The resin, when molded and thermoset, does not track under the influence of electric arcs, it has an arc resistance of 185 seconds (ASTM), and by the construction herein disclosed it will also have a high breakdown voltage. Coil supports and other high voltage apparatus have been successfully fabricated in this manner with satisfactory results.

In practicing the invention, it is particularly desirable to employ thermosetting resins with the asbestos fabric and the asbestos paper. The asbestos cloth has high temperature characteristics which make it suitable for use under conditions of relatively high temperature at which thermoplastic resins would fail due to flow and softening. In some instances, the high temperature resins that are not necessarily thermosetting may be employed in the practice of the invention. For example, glycerol phthalate resins and silicone resins such as phenyl-ethyl silicone and methyl silicone may be employed in preparing insulation from asbestos cloth and asbestos paper as disclosed herein.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. A composite electrical insulating member comprising, in combination, a plurality of laminations of long fiber woven asbestos fabric, a resin impregnating the fabric, and a layer of asbestos paper coextensive with and disposed between two of the laminations of asbestos fabric, the asbestos paper comprising a minor proportion of the member, the asbestos paper composed of short fiber asbestos, the asbestos paper being impregnated with resin, the asbestos fabric and paper bonded by the resin into a unitary member having higher breakdown voltage in a direction perpendicular to the plane of the laminations than a member without the asbestos paper.

2. In an insulated electrical conductor, a member applied to the electrical conductor to provide electrical insulation therefor, the member composed of laminations of long fibered woven asbestos fabric impregnated with resin and so formed for application to the electrical conductor that the plane of the laminations is generally perpendicular to the voltage gradient and a layer of short fibered asbestos paper impregnated with resin disposed between two laminations of asbestos fabric in a similar conformation, the layer of asbestos paper being coextensive with the laminations of the asbestos fabric, the asbestos fabric and paper bonded by the resin into a unitary member having a higher breakdown voltage in a direction perpendicular to the plane of the laminations as compared to a similar member without asbestos paper.

3. A composite electrically insulating member comprising, in combination, a plurality of laminations of woven asbestos fabric composed of relatively long fibers, a thermosetting resin impregnating the fabric, a layer of short fiber asbestos paper previously heat treated at temperatures of the order of 200° C. for a prolonged period of time to remove organic matter therefrom, and thermosetting resin applied to the asbestos paper, the treated asbestos paper being applied between two laminations of the asbestos fabric and coextensive with the asbestos fabric, the asbestos fabric and paper bonded by the thermosetting resin into a solid member having a higher dielectric breakdown voltage in a direction perpendicular to the plane of the laminations than a similar member without the asbestos paper.

EARL L. SCHULMAN.

REFERENCES CITED

The following references are of record in the file of this patent:

UNITED STATES PATENTS

| Number | Name | Date |
| --- | --- | --- |
| 404,913 | Johns, Jr. | June 11, 1889 |
| 906,252 | Meek | Dec. 8, 1908 |
| 1,019,406 | Baekland | Mar. 5, 1912 |
| 1,673,239 | Groff | June 12, 1928 |
| 1,947,096 | McCulloch | Feb. 13, 1934 |
| 1,982,539 | Reeves | Nov. 27, 1934 |
| 2,162,953 | Lattin | June 20, 1939 |
| 2,182,668 | Kaimer | Dec. 5, 1939 |

FOREIGN PATENTS

| Number | Country | Date |
| --- | --- | --- |
| 250,525 | Great Britain | Dec. 10, 1926 |
| 309,506 | Great Britain | Dec. 24, 1929 |